July 3, 1962
E. J. HESSE ETAL
3,042,093
DATE DICING MACHINE
Filed July 17, 1958
5 Sheets-Sheet 1
FIG_1
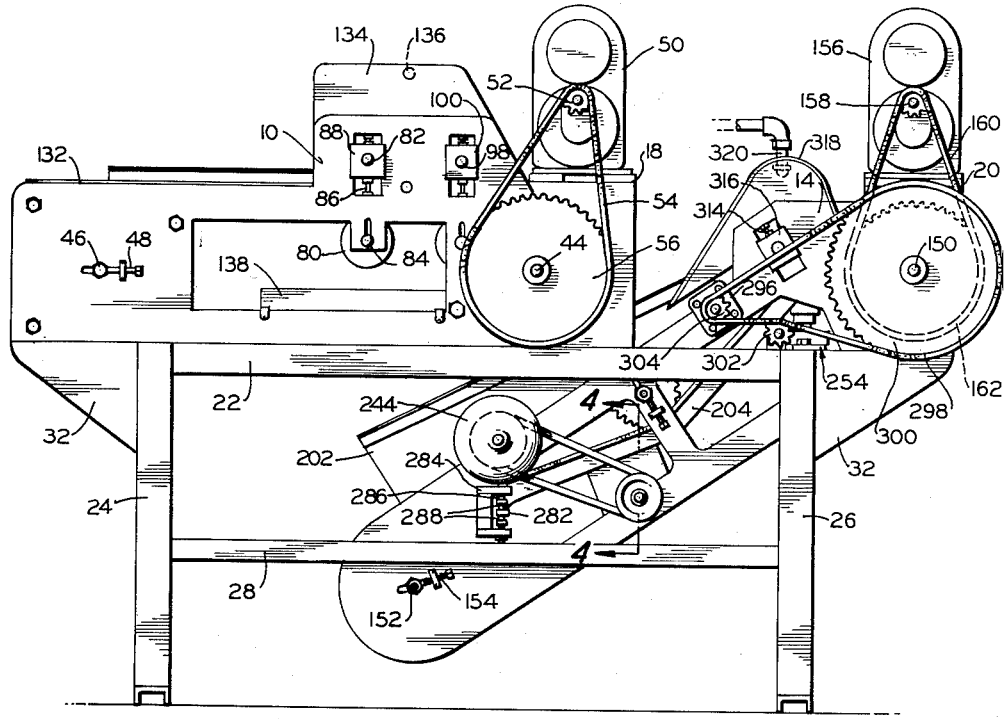
FIG_5
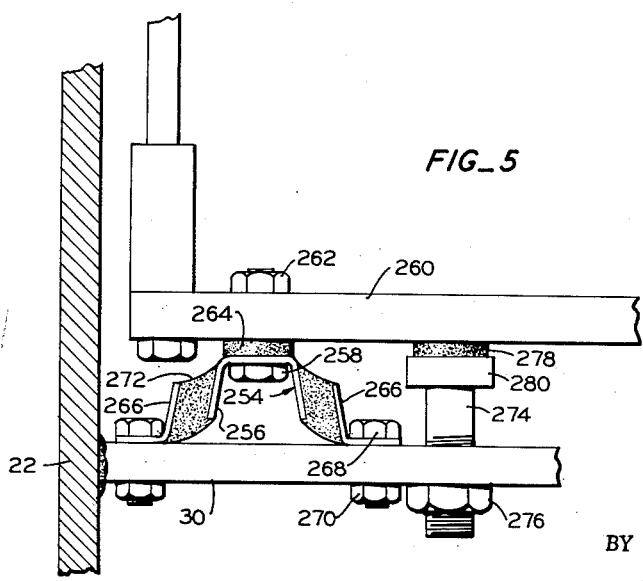
INVENTORS
EARL J. HESSE
JOHN L. MARGAROLI
BY
*Naylor & Neal*
ATTORNEYS

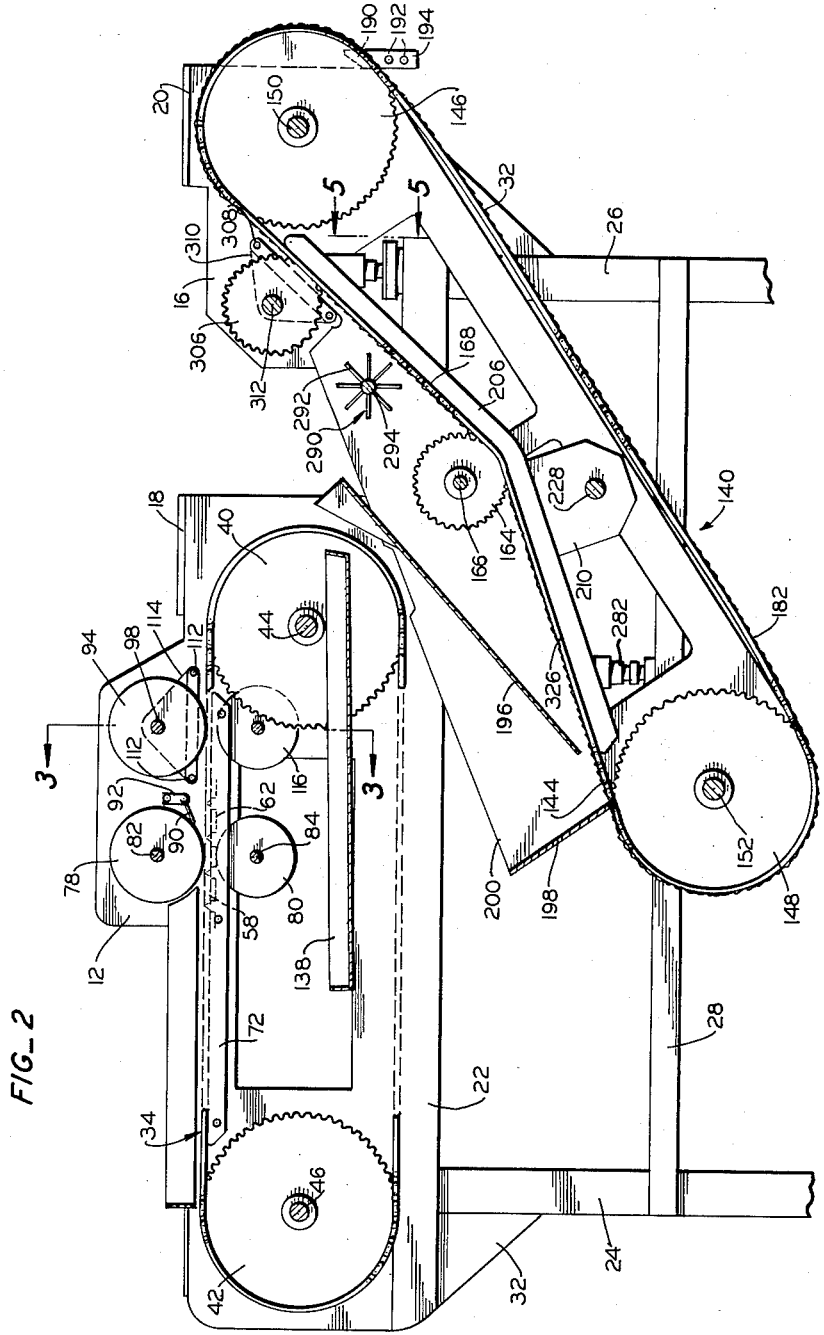

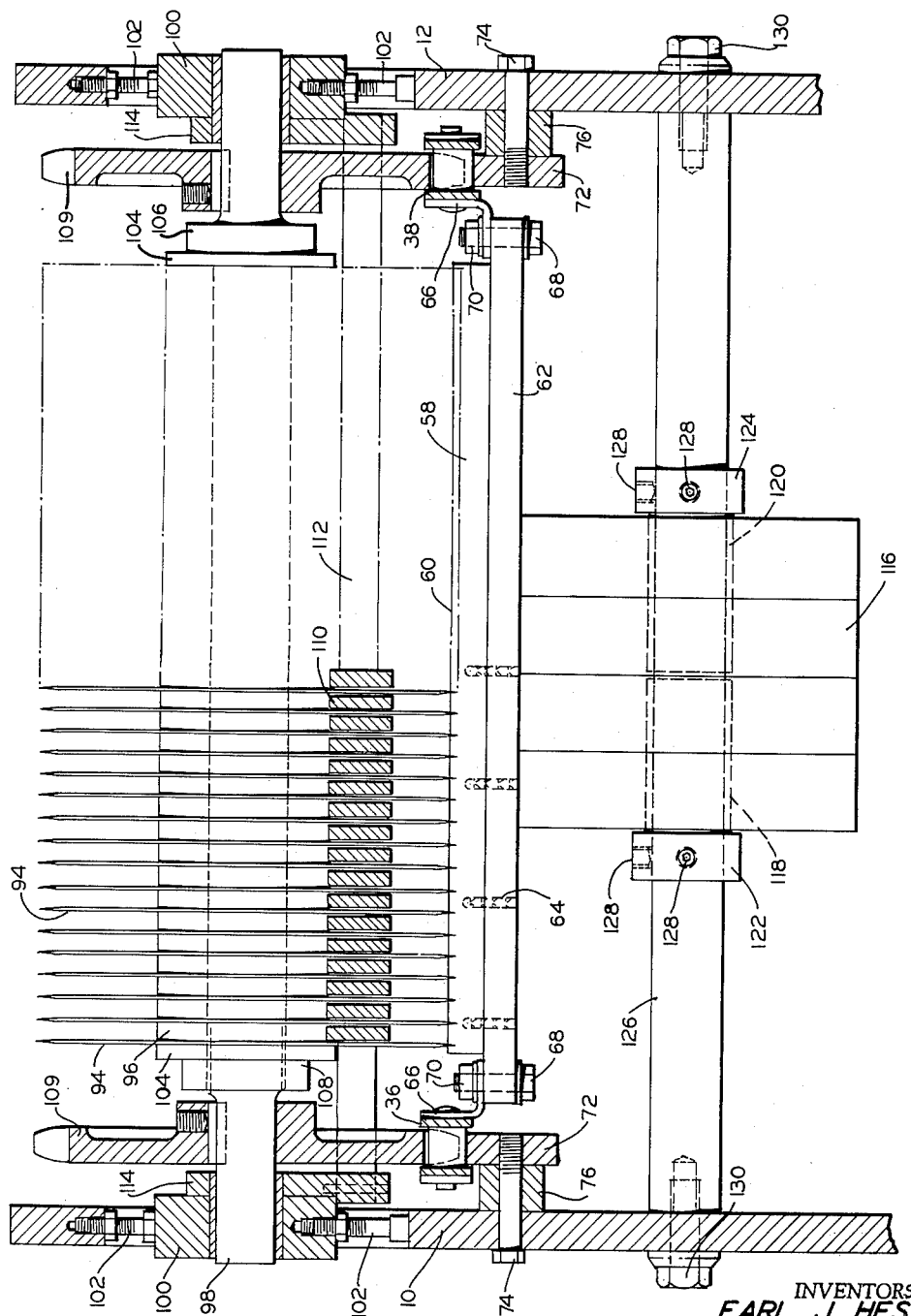

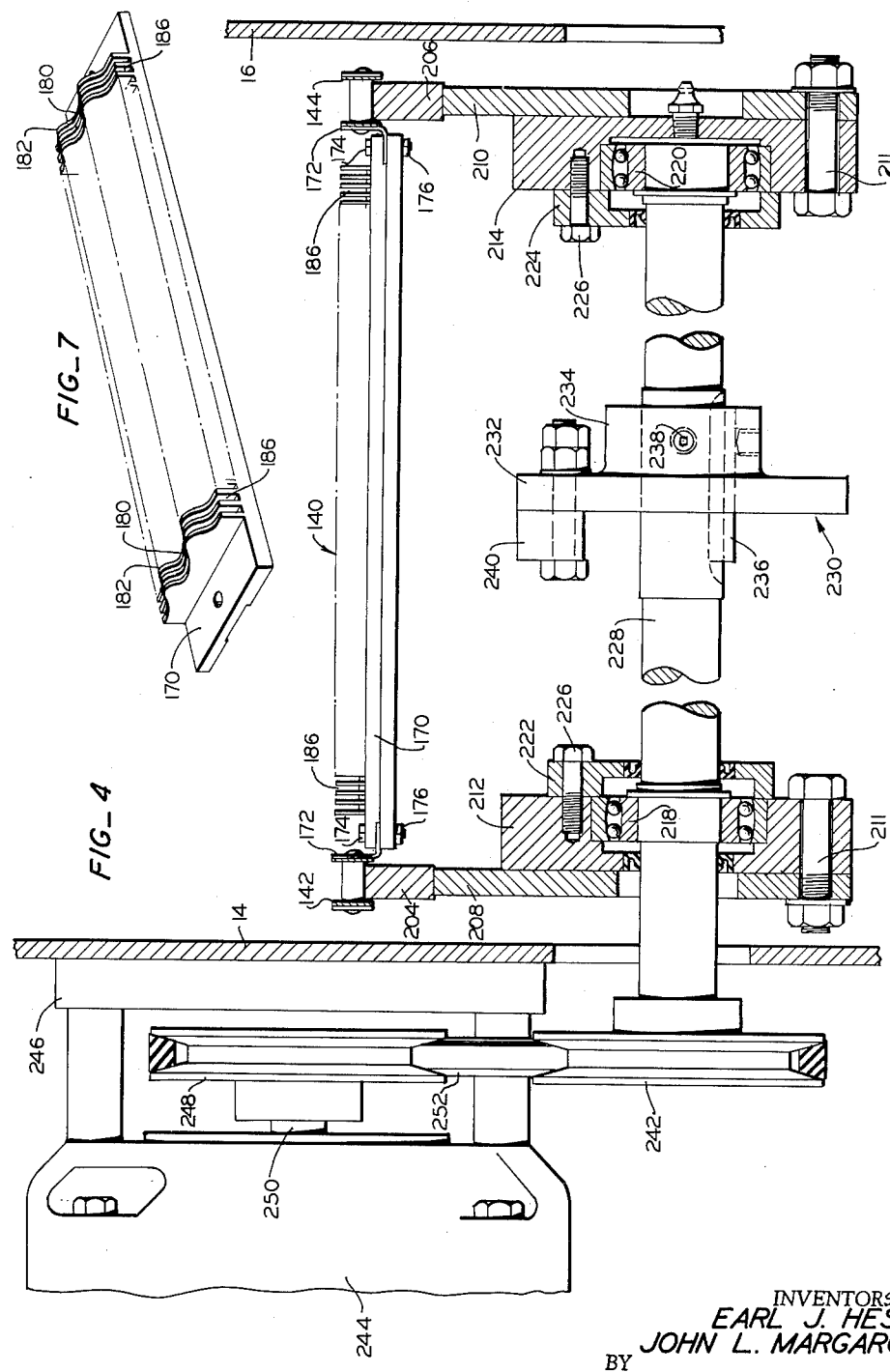

July 3, 1962
E. J. HESSE ETAL
3,042,093
DATE DICING MACHINE
Filed July 17, 1958
5 Sheets-Sheet 5
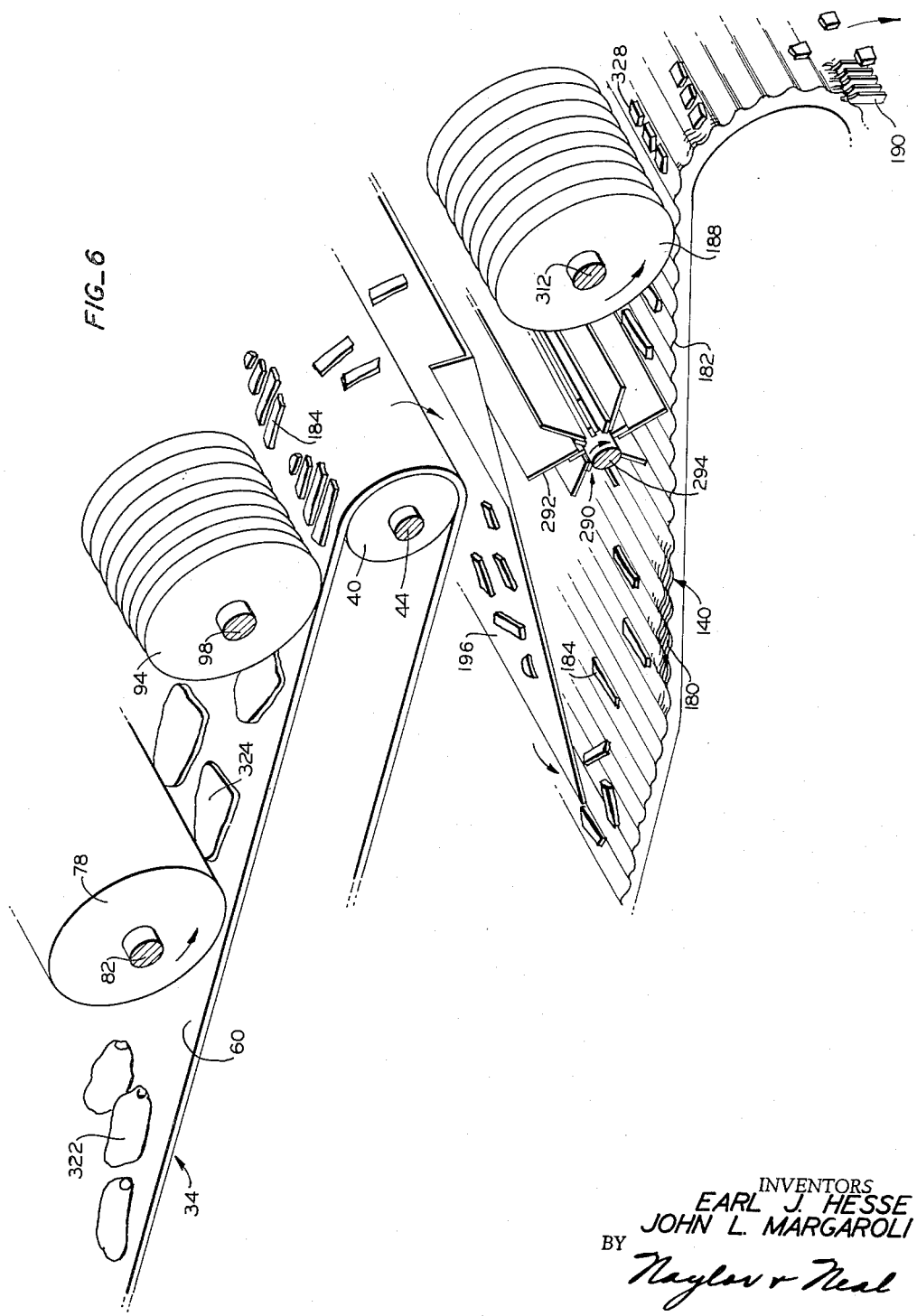
FIG_6
INVENTORS
EARL J. HESSE
JOHN L. MARGAROLI
BY
Naylor & Neal
ATTORNEYS "# United States Patent Office 3,042,093
Patented July 3, 1962

3,042,093
DATE DICING MACHINE
Earl J. Hesse and John L. Margaroli, Oakland, Calif., assignors to George W. Ashlock Company, San Leandro, Calif., a corporation of California
Filed July 17, 1958, Ser. No. 749,293
4 Claims. (Cl. 146—78)

This invention relates to a machine and method for the handling of fruits and vegetables and more particularly to a machine well adapted to the slicing of fruits and vegetables in uniform fashion, as by dicing, and has particular application for the dicing of pitted fruit such as dates.

It is an object of this invention to provide a method and machine for the slicing of fruits and vegetables into pieces of substantially similar size and shape which is particularly well adapted to the handling of pitted fruit such as dates and the like.

It is a further object of this invention to provide a method and machine for receiving fruits and vegetables in discontinuous and unoriented, or haphazard, fashion for orientation and slicing in uniform shapes as by dicing.

A still further object is to provide a method and machine for the uniform orientation and slicing of discontinuous sliced strips of fruits and vegetables which is particularly well suited for handling strips of sticky fruit such as dates.

Other objects and advantages of this invention will become apparent from the following description taken in conjunction with the drawings forming part of this specification, in which:

FIGURE 1 is a view in side elevation of the dicing machine of this invention adapted for the dicing of dates.

FIGURE 2 is an enlarged view of the machine, with the side plate removed, showing the same partially in side elevation and partially in section.

FIGURE 3 is an enlarged view in section taken on line 3—3 of FIGURE 2 and showing the slicing means of the first slicing station.

FIGURE 4 is an enlarged view in section taken on line 4—4 of FIGURE 1 and showing the vibration means for the orienting conveyor.

FIG. 5 is a detail view in section taken on line 5—5 of FIGURE 2.

FIGURE 6 is a semi-schematic showing in perspective of the flow of dates through the machine of this invention.

FIGURE 7 is a view in perspective of one of the orienting conveyor bars.

Referring initially to FIGURE 1, the machine is carried upon a supporting framework comprising two sets of parallel spaced apart side plates 10 and 12, and 14 and 16, respectively interconnected in rigid fashion by transverse horizontal motor support platforms 18 and 20. Platforms 18 and 20 are carried upon pairs of spaced apart horizontal members 22 which are in turn secured to pairs of upright members 24 and 26 interconnected by pairs of horizontal longitudinal members 28 and horizontal transverse members 30. Gusset plates 32 extending between horizontal members 22 and the upright members 24 and 26 increase the rigidity of the framework.

The first station or feed conveyor 34 comprises a pair of parallel spaced apart endless chains 36 and 38 entrained about pairs of driving sprockets 40 and idler sprockets 42 respectively carried for rotation upon shafts 44 and 46 suitably journalled in side plates 10 and 12, conveyor tension being adjustable through idler shaft set screws 48. Motor 50, through sprocket 52 secured to its output shaft and drive chain 54, serves to drive sprocket 56, secured to shaft 44 outwardly of plate 10, drive sprockets 40 and chains 36 and 38. A plurality of resilient parallel bars 58 closely spaced apart to provide the feed conveyor 34 with a substantially planar conveying surface 60 are secured to rectangular support bars 62 (FIGURE 3) through a plurality of upstanding notched pins 64 and are inwardly tapered toward their supported sides to facilitate movement around sprockets 40 and 42. Support bars 62, fabricated of a suitable material such as aluminum, are secured at either end to chain-carried angular cleats 66 by means of bolts 68 and nuts 70. Conveyor sag is prevented by horizontal chain tracks 72 secured at either side of the conveyor to the side plates 10 and 12 through use of studs 74 and spacers 76.

A pair of cylindrical presser rollers 78 and 80, carried upon shafts 82 and 84, the former journalled for adjustment through screws 86 in movable journal blocks 88, are disposed above and below conveyor 34 to cooperatively pressingly engage the conveyor as they are driven in rotation at a peripheral speed and in a direction similar to that of the conveyor 34 by sprockets (not shown) disposed at either end engaging chains 36 and 38. A stripper blade 90 maintained in engagement with the surface of the presser roller 78 and carried at either end upon brackets 92 serves as a scavenging element to prevent fruit from clinging to the roller.

In FIGURE 3 is illustrated the first slicing station comprising a plurality of thin annular slicing knives 94 spaced apart by spacer elements 96 and carried upon shaft 98 journalled in journal bars 100, the latter being vertically adjustable through set screws 102. The knives 94 and the spacer elements 96 are clamped together and fixedly positioned on shaft 98 by end rings 104, collar 106 secured to shaft 98, as by welding and end nut 108 threadedly engaging shaft 98 to press against associated end ring 104. Secured at either end of the shaft 98 are sprockets 109 engaging conveyor chains 36 and 38 and serving, like the end disposed sprockets of presser rollers 78 and 80, to drive the slicing knives 94 in rotation at a peripheral speed and in a direction similar to that of the conveyor 34. It will be noted that for effective slicing the knives 94 are positioned to project into the resilient bars, the knives cutting their own accommodating slots in the surface 60 of the conveyor 34 after a short period of conveyor run-in. A plurality of stripper bars 110 serve to scavenge pieces of sliced fruit from the rotating slicing knives 94 after the cutting operation and are positioned interjacent the knives upon cross shafts 112 end-supported by brackets 114 secured to journal bars 100. A segmented presser roller 116 is disposed for rotation upon sleeves 118 and 120, being end restrained by the flanges 122 and 124 thereof. Sleeves 118 and 120 are secured to shaft 126 through use of set screws 128 extending through the flanges 122 and 124, shaft 126 being fixedly secured at either end to side plates 10 and 12 through use of studs 130. Presser roller 116, adapted to rotate freely, provides conveyor support in urging the support bars 58 upward to maintain the planar conveyor surface 60 in cutting position relative to the slicing knives 94.

A flanged cover 132 extends between side plates 10 and 12 guiding fruit onto the feed conveyor 34 for slicing. The hood 134 secured to side plates 10 and 12, above feed conveyor 34, serves to direct the flow of lubricating fluid emitted from spray nozzle 136 disposed beneath the hood to the presser roller 78, the knife blades 94 and the scavenging means associated therewith. Carried between side plates 10 and 12 beneath conveyor 34 is a shallow pan 138 acting as a catch basin to collect excess lubricating fluid for removal from the machine.

In FIGURE 2 is illustrated the orienting conveyor 140 which is comprised of pairs of endless chains 142 and 144 entrained about pairs of driving sprockets 146 and idler sprockets 148 carried upon shafts 150 and 152 suitably journalled for rotation in side plates 14 and 16, conveyor tension being adjustable through idler shaft"

set screws 154. Motor 156, through sprocket 158 secured to its output shaft and drive chain 160, serves to drive sprocket 162, secured to shaft 150 outwardly of side plate 14, drive sprockets 146 and chains 142 and 144. A pair of idler guide sprockets 164 are disposed interjacent the ends of the conveyor 140, being carried upon shaft 166 adjustably journalled in side plates 14 and 16 and serving to increase the angle of upward inclination of the top portion 168 of the conveyor upper reach, for reasons hereinafter more fully explained.

As shown in FIGURE 4, a plurality of parallel bars 170 (FIGURE 7) closely spaced apart and inwardly tapered to facilitate conveyor travel about sprockets 146 and 148, are secured intermediate chains 142 and 144 to chain-carried angular cleats 172, the latter being connected by means of bolts 174 and nuts 176 to lugs 178 of the bars 170. Each bar is formed with a longitudinal trough 180 therein and cooperatively forms with either adjacent conveyor bar additional such troughs thus giving a substantially continuous undulating conveying surface to conveyor 140. The troughs 180 are formed with relatively sharply upturned trailing sidewalls 182 to facilitate retention of date slices 184 moving upon the inclined biangular upper reach of the conveyor. Parallel transverse kerfs 186 are provided in each bar 170 to permit passage therethrough of the lower edges of the second slicing station knives 188. A plurality of spaced apart parallel discharge fingers 190 are positioned adjacent the upper end of the orienting conveyor lower reach to act as scavenger means, said fingers being carried upon cross shafts 192 which are secured through brackets 194 to side plates 14 and 16.

A hopper is disposed beneath the feed conveyor 34 for receiving therefrom sliced fruit and is comprised of an inclined open-ended floor or chute, 196, upwardly extending end wall 198 and sidewalls 200 and 202, the sidewalls being secured to side plates 12 and 14.

In FIGURE 4 is illustrated the means utilized for imparting high frequency vibration to the biangular upper reach of the orienting conveyor 140, such means comprising: elongated vibrator tracks 204 and 206 from which depend brackets 208 and 210; bearing supports 212 and 214 secured to the brackets 208 and 210 by bolts 211 and carrying therein bearings 218 and 220; bearing plates 222 and 224 secured to bearing supports 212 and 214 through studs 226; a shaft 228 mounted for rotation in bearings 18 and 220; a flywheel 230 comprised of a disc portion 232 and hub 234 secured against movement relative to shaft 228, as by key and set screw means 236 and 238, said disc portion 232 having adjustably and removably secured thereto a weight member 240; a sheave 242 fixedly secured to shaft 228 outwardly of side plate 14; an electric motor 244 mounted by means of spacer plate 246 on side plate 14 and having a sheave 248 secured to its output shaft 250; and a V-belt 252 trained around the sheaves 242 and 248.

Mounting of the vibrator tracks 204 and 206 at their upper ends is accomplished through vibration dampener members 254, typically illustrated in FIGURE 5 as comprised of centrally disposed U-shaped metal members 256 through which bolts 258 extend securing vibrator track-connecting cross member 260 thereto through use of nuts 262 and interposed rubber pads 264, outer L-shaped metal members 266 secured as by bolts 268 and nuts 270 to transverse frame member 30, and intermediate rubber elements 272 which are bonded to metal elements 256 and 266. Bolts 274 and nuts 276 provide additional vibrator track support, rubber pads 278 being interposed between the flanges 280 of the bolts 274 and member 260.

At their lower ends the vibrator tracks 204 and 206 are rigidly connected by transverse member 282 which projects beyond the side plates 14 and 16 being secured to the projecting arms of brackets 284 by flanged bolts 286, and interposed rubber pads 288.

Disposed adjacent the upper reach of the orienting conveyor 140 above idler 164 is a brush-back paddle wheel 290 comprised of a plurality of radially disposed blades 292 secured to shaft 294. Said shaft is carried in journal plates 296, which are secured to side plates 14 and 16, and is driven in rotation in a direction opposite the path of travel of the orienting conveyor 140 through drive chain 298 which is trained about sprocket 300, idler sprocket 302, and sprocket 304, the latter being fixedly secured to shaft 294 (FIGURE 1).

A second slicing station is disposed above paddle wheel 290 near the top of the upper portion 168 of the orienting conveyor upper reach. Inasmuch as the second slicing station is substantially similar to the first slicing station previously described, only a brief description is herein set forth. Like the first slicer station, this station incorporates a plurality of parallel spaced apart annular slicing knives 188 driven in rotation at a peripheral speed and in a direction similar to that of the orienting conveyor 140 by means comprising chains 142 and 144 and end sprockets 306 with scavenging means comprised of stripper bars 308 being provided adjacent the slicing knives 188 and being mounted upon brackets 310 secured to the side plates 14 and 16. The knife-carrying shaft 312 is adjustable in a manner similar to that shown for the first slicer station in FIGURE 3 through use of screws 314 and movable rectangular journal blocks 316. A hood 318 is provided to direct lubricating fluid emitted from spray nozzle 320 upon the slicing knives 188 and the associated scavenging means.

In describing the operation of the subject date dicing machine, reference will initially be made to FIGURES 1, 2 and 6. Motors 50 and 156 are started to effect rotation of feed conveyor 34, orienting conveyor 140, the presser rollers 78 and 80, the first station slicing knives 94, the paddle wheel 290, and the second station slicing knives 188. Spray nozzles 136 and 320 are opened to a source of pressurized lubricating fluid. Motor 244 is energized and the shaft 228 is thereby rotated at a velocity of approximately 1800 r.p.m. The rapidly rotating off-center weight 240 carried by the flywheel 230 imparts a rapid oscillatory vibration to the vibratory tracks 204 and 206, the combined up and down and to and fro movement of this assembly being permitted by the resilient mounting for the lower end of the assembly comprised of the rubber pads 288 and the resiliently pivotal connection between the upper end of the assembly and the frame comprising the rubber elements 272 of the vibration dampeners 254.

Pitted dates 322 are fed in haphazard fashion onto the feed conveyor 34 either manually or by machine through flanged cover plates 132. The dates 322 are thereupon carried by the conveyor 34 beneath presser roller 78 from which they emerge in flattened condition, as at 324 in FIGURE 6. Cooperative action of lower presser roller 80 in urging the feed conveyor upper reach upwardly against presser roller 78 assures effective flattening of the dates, the thickness of the flattened dates being dependent upon the position of the roller shaft 82, as determined by its supporting journal blocks 88. The dates in flattened condition, pass from the presser roller 78 beneath the slicing knives 94 which are rotating at a peripheral speed and in a direction substantially the same as the speed and direction of travel of the adjacent reach of the feed conveyor.

The dates are cut into strips 184 of generally uniform widths but of varying lengths, depending upon the orientation of the flattened dates as they pass under the slicing knives 94. Projection of the lower edges of the slicing knives 94 into the self-cut slots in the surface 60 of the feed conveyor 34 together with the cooperative action of the presser roller 116 located therebeneath in urging the conveyor 34 into a position closely adjacent the slicing knives 94, assures effective slicing of the dates. Lubricating fluid sprayed upon the slicing knives by the nozzle 136 serves as a lubricant for both the knives 94 and the dates during the slicing operation, with the stripper bars 110 preventing adherence of random date slices to the rotating knives after the slicing operation.

Passing from the knives 94 of the first slicing station, the strips 184 are deposited by the feed conveyor 34 upon the chute 196 from which they drop onto the orienting conveyor 140 in random fashion. Thus the date strips 184 may initially lie in a variety of positions relative to the troughs 180 of the orienting conveyor 140, which troughs serve to properly orient the date slices with their sliced edges normal to the second station slicing knives 188 for transverse slicing. The vibrator tracks 204 and 206 impart to the orienting conveyor 140 riding thereon rapid oscillatory vibrations serving thereby to orient the often sticky date slices 184 with their sliced edges longitudinally of the troughs 180. To facilitate alignment of the date slices and the filling of a substantial proportion of the conveyor troughs 180, the lower portion 326 of the upper reach is upwardly inclined in the direction of conveyor run, the preferred angle of such inclination with the horizontal being approximately 25°. However suitable results are obtained within the approximate range of 20°–30°. By the time the date slices 184 reach a position near the upper end of the lower portion 326 of the orienting conveyor upper reach, the majority of such slices have become oriented in the troughs 180. The difficulties involved in so orienting the dates within the troughs due to the tendency of such date pieces to stick and cling together are overcome by the combination of the inclined lower portion 326 of the upper reach of the conveyor 140 and the rapid vibratory movement imparted by the vibrator tracks 204 and 206.

The blades 292 of the paddle wheel 290 rotate in a direction opposite to that of orienting conveyor travel, and are disposed to sweep or brush-back the remaining unoriented date slices projecting above the trough edges, such slices falling into aligned position in adjacent troughs or gravitating downward to the lower portion 326 of the conveyor upper reach to be oriented by a repetition of the process. In practice it has been found that a preferred angle with respect to the horizontal for the upper portion 168 of the conveyor upper reach is approximately 50°, although suitable results are obtained within the approximate range of 45°–55°. It may be noted that some of the dates which have not become fully seated upon reaching the brush-back paddle wheel 290 will, upon engagement therewith, seat in adjacent troughs; nevertheless, little date orientation is both initiated and completed along the upper portion 168 of the conveyor 140.

The date slices 184, oriented longitudinally of the troughs 180, pass from beneath the paddle wheel 290 to the second slicing station knives 188, the latter rotating at substantially the same peripheral speed and in the same direction as the adjacent date-carrying upper reach of the orienting conveyor 140. As the date slices 184 are engaged by the rotating knives 188, they are urged against the leading sidewalls of the troughs 180 thereby being fixedly positioned for the second stage slicing operation. The lower edges of the knives 188 project into the kerfs 186 of the orienting conveyor bars 170 during the slicing operation, thus assuring effective transverse cutting of the date slices which issue from the knives 188 in diced form, as at 328 in FIGURE 6 to thereupon pass into suitable receiving means (not shown). Lubricating fluid sprayed from nozzle 320 upon the slicing knives 188 serves to lubricate both the date slices 184 and the knives during the second stage slicing operation, and the stripper bars 308 prevent adherence of diced dates to the rotating slicing knives 188. The blade-like fingers 190 adjacent the upper end of the orienting conveyor 140 similarly perform a scavenging function in preventing diced dates from adhering to the orienting conveyor after they pass a location for discharge therefrom into the receiving means.

Although this invention has been described above with respect to an embodiment for the dicing of dates for which it has particular application, it is not necessarily limited thereto. Thus, it may be used for the regular slicing or dicing of other fruits and also vegetables, with but relatively minor modifications. It may further be appreciated that other alterations, changes or modifications may be made in the above described embodiment without departing from the spirit or the scope of the invention as herein claimed.

What is claimed is:

1. A machine for dicing pitted fruit such as dates comprising a first endless conveyor having an upper reach to carry individual units of fruit to be diced, means for driving said conveyor, first station slicing means comprising a plurality of parallel spaced apart rotatably mounted slicing knives positioned above the upper reach of said conveyor but having their lower cutting edge portions extending beneath the plane of the upper surface of the upper reach of said first conveyor, whereby said knives slice the units of fruit into separated strips of substantially uniform width, means for rotating said knives so that said lower cutting edge portions thereof move in the direction of movement of said upper conveyor reach and at substantially the same rate of movement, a second endless conveyor adaped to receive the separated strips of fruit which issue from said first conveyor, said second conveyor having an upwardly inclined upper reach portion and having a plurality of kerfed parallel transverse troughs to accommodate longitudinally therein said separated strips of fruit, means for driving said second conveyor to cause said fruit strips to ascend the upper reach portion thereof, second station slicing means comprising a plurality of parallel spaced apart rotatably mounted slicing knives disposed over the upper reach portion of said conveyor at right angles to said troughs and having their lower cutting edge portions extending into said kerfs to subdivide said separated strips of fruit into smaller separated parts, and means for rotating said knives so that said lower cutting edge portions thereof move in the direction of movement of the upper reach of said second conveyor and at substantially the same rate of movement.

2. The machine of claim 1 including means disposed adjacent the upper reach of said first conveyor operable to decrease the thicknesses of said units of fruit to a predetermined value before said units pass through said first station slicing means.

3. The machine of claim 2 including means connected to said second conveyor and operable to impart vibrational movement to the upper reach portion thereof.

4. The machine of claim 3 including paddle wheel means rotatably mounted adjacent the upper reach portion of said second conveyor, and means for rotating said paddle wheel means in a direction opposite to the direction of travel of said conveyor to brush back fruit slices not properly disposed longitudinally within said troughs.

References Cited in the file of this patent
UNITED STATES PATENTS

| | | |
|---|---|---|
| 1,919,964 | Spang | July 25, 1933 |
| 1,962,779 | Kurm et al. | June 12, 1934 |
| 1,975,261 | Erickson | Oct. 2, 1934 |
| 1,992,714 | Nelson | Feb. 26, 1935 |
| 2,092,103 | Blakeney et al. | Sept. 7, 1937 |
| 2,350,586 | Carroll | June 6, 1944 |
| 2,610,724 | Dudley | Sept. 16, 1952 |
| 2,753,907 | Schmidt et al. | July 10, 1956 |
| 2,811,997 | Schmidt et al. | Nov. 5, 1957 |
| 2,815,622 | Barrett | Dec. 10, 1957 |
| 2,828,788 | Ashlock | Apr. 1, 1958 |
| 2,890,784 | Barrett | June 16, 1959 |
| 2,954,862 | Clark | Oct. 4, 1960 |